United States Patent
Doan

[19]

[11] Patent Number: 6,109,424
[45] Date of Patent: Aug. 29, 2000

[54] CHASSIS/BODY MARRIAGE LIFT MACHINE

[75] Inventor: Paul G. Doan, Warren, Mich.

[73] Assignee: Fori Automation, Inc., Shelby Township, Mich.

[21] Appl. No.: 09/045,321

[22] Filed: Mar. 20, 1998

Related U.S. Application Data

[60] Provisional application No. 60/041,054, Mar. 20, 1997.

[51] Int. Cl.[7] ................................................. B65G 29/00
[52] U.S. Cl. ............................. 198/468.8; 29/430; 29/824
[58] Field of Search .............................. 198/343.1, 343.2, 198/346.1, 346.2, 346.3, 468.8; 187/226, 236; 104/287, 290, 165, 180, 187; 29/430, 824

[56] References Cited

U.S. PATENT DOCUMENTS

| | | | |
|---|---|---|---|
| 4,723,356 | 2/1988 | Sakamoto et al. | 198/468.8 X |
| 4,928,386 | 5/1990 | Schupp et al. | 198/468.8 X |
| 5,303,655 | 4/1994 | Summa et al. | 198/345.3 X |

*Primary Examiner*—James R. Bidwell
*Attorney, Agent, or Firm*—Reising, Ethington, Barnes, Kisselle, Learman & McCulloch, P.C.

[57] ABSTRACT

A machine for supporting and lifting an automotive chassis module into position for assembly with a vehicle body being conveyed overhead along an assembly line includes a mobile vehicle having at least one fixture arranged above the vehicle for receiving and supporting the chassis module, and a guided lift mechanism for moving the fixture vertically between lowered and raised positions. The lift mechanism includes a push chain that is coupled to the fixture and a sprocket that engages the chain and is operative when driven to displace a section of the chain vertically to move the fixture. The lift mechanism further includes at least one support member extending between the fixture and the vehicle which operates to guide the fixture in the vertical direction while isolating the push chain from any loads transverse to the vertical direction.

20 Claims, 7 Drawing Sheets

CHASSIS/BODY MARRIAGE LIFT MACHINE

This application claims benefit of Provisional Application Ser. No. 60/041,054 filed Mar. 20, 1997.

TECHNICAL FIELD

This invention relates generally to lift machines used in the automotive vehicle manufacturing industry for marrying chassis modules with vehicle bodies and, more particularly, for lifting the chassis modules into place underneath suspended vehicle bodies for subsequent fastening of the chassis modules to the vehicle bodies.

BACKGROUND OF THE INVENTION

In the manufacturing of automotive vehicles, it is customary to preassemble components of the chassis of the vehicle before marrying them with the vehicle body. The bringing together of the chassis and body takes place on a continuously moving conveyor line. The body is typically conveyed overhead by a conveyor, and the chassis components to be married to the body are supported by a fixture of a moving lift machine that operates to move the chassis components into position beneath the moving body while lifting the chassis components into position for assembly with the body.

Many of the lift machines in present use employ a pneumatically powered hydraulic lift mechanism to raise and lower the fixture or fixtures that carry the chassis components. Some machines have a single fixture, whereas others are equipped with two such fixtures provided at opposite ends of the lift machine. Each fixture has its own hydraulic system and the two are often synchronized to operate in unison.

The hydraulic systems each include a fluid cylinder that is mounted on the machine and secured to its associated fixture. A pair of multi-stage telescoping vertical guides are provided on opposite sides of each cylinder and guide the fixture vertically.

A longitudinally extending cabinet projects above a base of the machine in the space between the fixtures and houses various components associated with the control and operation of the hydraulic/pneumatic systems. Among the components accommodated within the cabinet is a reservoir containing hydraulic fluid to be supplied to the cylinders, and an onboard pneumatic pump system that drives the hydraulics. Then pump system has onboard rechargeable air tanks also housed in the cabinet that hold a supply of pressurized air for operating the pump. The pump in turn controls the flow of hydraulic fluid to and from the cylinders in order to raise and lower the platforms.

While the traditional hydraulic/pneumatic lift mechanism of such machines performs satisfactorily in raising and lowering the platforms, it has several inherent disadvantages which add cost and complexity to the operation, many of which are unique to the art of chassis component lift machines.

The hydraulic systems have various seals, fittings and other components that are prone to frequent leakage and failure and require the constant attention of skilled workmen to maintain them in working order. It also requires that a fairly large capacity hydraulic fluid reservoir be carried on board the machine to supply fluid to the cylinders, adding to the size, cost and weight of the machines.

The rechargeable pneumatic pump system presents its own set of problems. The pump relies for its power on the supply of pressurized air from the onboard tanks. When the air in the tanks is exhausted, the pump and thus the hydraulics are no longer operational. A spent machine must be routed out of the normal assembly loop to a specialized recharge station where the tanks are refilled with pressurized air. During this time, another machine must be introduced in its place to support the continuous assembly operation. Since a full charge typically provides at most three lift cycles before requiring recharging, a number of extra machines must be kept on hand to support the assembly operation, adding further to the cost of supporting the operation. The specially equipped charging stations also add to the cost of the operation and can occupy valuable floor space of a facility.

Another objection inherent with the existing hydraulic/pneumatic lift system is that the elevated cabinet needs to be fairly tall in order to house the various components of the hydraulic/pneumatic system. The presence of the elevated cabinet can obstruct full access to the components supported on the fixtures to those assisting in the assembly operation, and particularly their step-through passage across the machine, making it less convenient to reach certain areas.

A chassis lift apparatus constructed in accordance with the present invention overcomes or greatly minimizes the foregoing objections to conventional hydraulic/pneumatic chassis lift machines.

SUMMARY OF THE INVENTION

An apparatus for lifting and supporting an automotive chassis module in position to be assembled with an automotive body along a moving assembly line comprises a mobile vehicle having at least one fixture for receiving and supporting the chassis module. A guided mechanical lift mechanism is carried by the vehicle and supports the fixture for vertical movement between a lowered position and a raised position. The mechanical lift mechanism includes a push chain that is fixed at its upper end to the fixture and is coupled to a driving sprocket for displacing a self-rigid vertical section of the chain vertically to move the fixture between the lowered and raised positions. The guided lift mechanism also includes at least one support member extending between the fixture and the vehicle and operative to guide the fixture in the vertical direction while isolating the push chain from any lateral flexing forces.

A principle advantage of the mechanical push chain lift mechanism of the invention is that it dispenses with the need for the traditional onboard hydraulic/pneumatic lift system and thereby eliminates the problems inherent with such lift systems. The mechanical push chain lift mechanism can be driven by an onboard electric motor and battery pack. The battery has the capacity for far more lift cycles in a full charge than does the traditional pneumatic pump system, enabling the machine to operate for a much longer period before requiring recharging. Consequently, fewer lift machines are needed to support a given assembly operation, saving cost and space. Eliminating the pneumatic pump system also eliminates the requirement for a specialized pneumatic recharge station, further contributing to cost and space savings.

Another advantage that the mechanical push chain lift mechanism has over the traditional hydraulic/pneumatic system is that it eliminates the hydraulic/pneumatic components that are normally housed in the elevated cabinet between the platforms. Consequently, a lift machine having the push chain lift mechanism of the present invention can be manufactured with a much lower cabinet, or perhaps none at all, increasing the step-through access across the machine, making it more convenient for those assisting with the operation to access the components.

Still a further advantage of the invention is that the mechanical push chain lift mechanism of the invention is by comparison far more compact than the traditional hydraulic/pneumatic lift mechanisms, reducing the overall size and weight of the machine. The mechanical push chain lift mechanism can be manufactured as a separate, compact, self-contained component that could be conveniently attached and detached as a unit from the vehicle when needed, simplifying the manufacture and maintenance of the machine.

Yet another advantage of the mechanical push chain lift mechanism is that it enables the fixture or fixtures to be lowered to a height well below that which is attainable with the traditional hydraulic/pneumatic lift mechanisms (i.e. about 29 inches above the shop floor vs. 33½ inches for a known hydraulic/pneumatic lift mechanism), while at the same time increasing the comparable height to which the fixture or fixtures can be raised (about 67 inches above the shop floor vs. 65 inches for a known hydraulic/pneumatic lift mechanism). The lower fixture position presents the chassis components at a level that is more accessible to the operators who loading and assembling the components on the fixture.

These and other features and advantageous of the invention will become more readily understood by those skilled in the art when considered in connection with the following drawings and detailed description.

BRIEF DESCRIPTION OF THE DRAWINGS

Preferred exemplary embodiments of the present invention will hereinafter be described in conjunction with the appended drawings, wherein like designations denote like elements, and.

DESCRIPTION OF THE PREFERRED EMBODIMENTS

Figure 1:
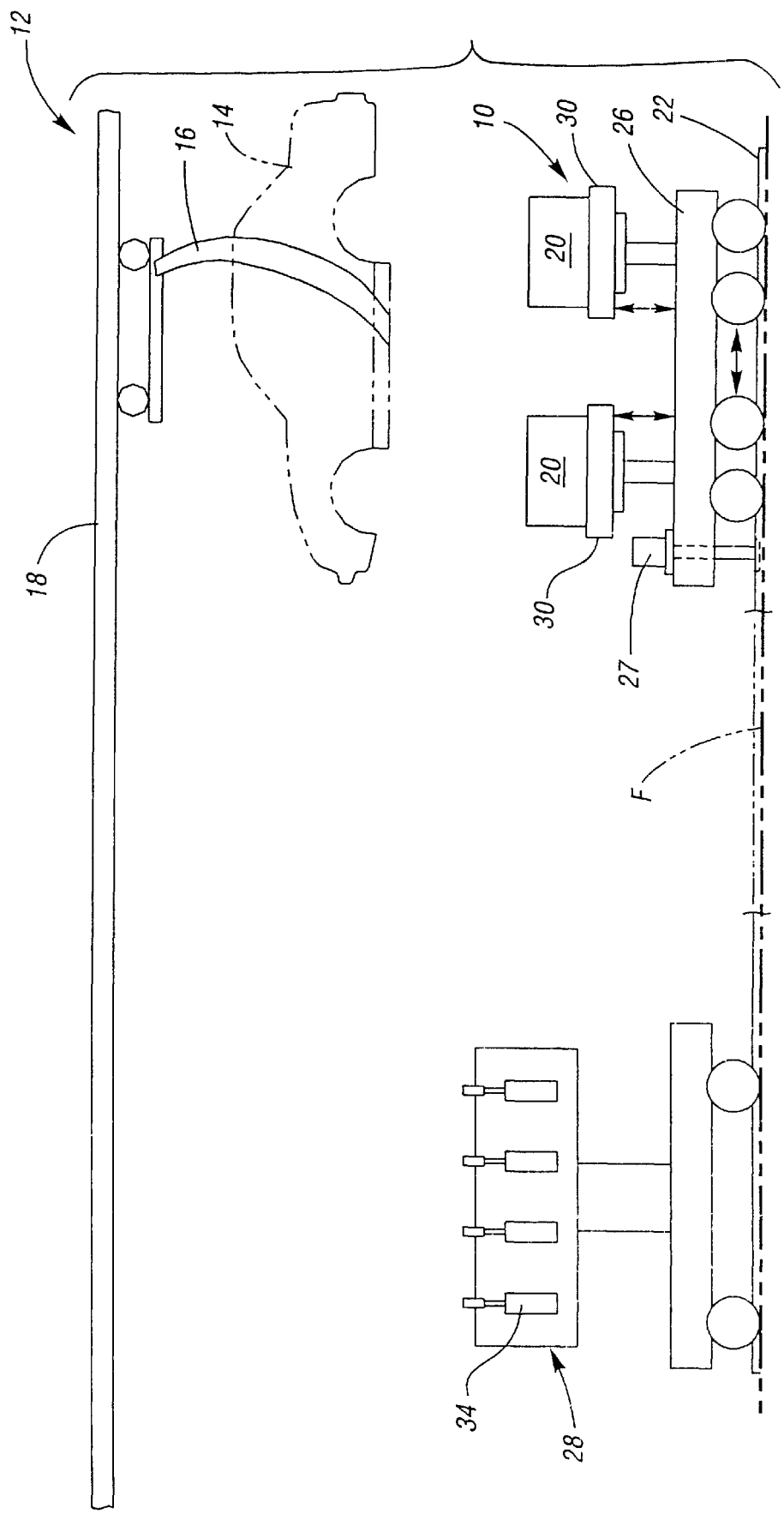
FIG. 1 is a diagrammatic elevational view depicting an embodiment of the lift machine of the present invention as it would be utilized as part of an automobile manufacturing production line.

As shown in FIG. 1, a chassis/body marriage lift machine (or chassis lift vehicle or apparatus) of the present invention is designated generally at 10 and is shown as it would be used at a chassis/body marriage and assembly station 12 of an automotive production line. Automotive vehicle bodies, such as that shown at 14, are brought into station 12 one at a time by an overhead clamshell conveyor 16 that is supported by and moves around an endless overhead rail 18. Automotive chassis modules 20 are also brought into station 12 via an overhead conveyor (shown at 24 in FIG. 2) and then are placed onto lift machine 10 for subsequent assembly into vehicle body 14.

To provide a continuously operating production line, the lifting and assembly of the chassis module 20 into vehicle body 14 is carried out while the vehicle body 14 moves along the clamshell conveyor 16. Thus the lift machine 10 runs along a floor track 22 (or is self-guided) underneath the conveyor 16 while chassis module 20 is lifted and fastened into the vehicle body 14. Movement of lift machine 10 along track 22 and the required synchronization of lift machine 10 with conveyor 16 are well known to those skilled in the art and will therefore not be elaborated upon.

The machine 10 includes a wheeled vehicle 26 that serves as the base or framework of the machine 10 on which other components of the machine are supported. There are generally three types or classes of vehicles 26 that may be utilized in conjunction with the push chain lift mechanism of the invention to be described. They include those that are self-propelled but guided by a floor track such as that shown at 22, a so-called tow-veyor type vehicle (FIG. 9) which is towed by a floor cable or the like along a floor track 22, or a self-powered, self-guided type vehicle, known generally as an automatic guided vehicle or AGV (FIG. 8), which is self-propelled and programmable to be self-guided without the assistance of a floor track along a preset path. Of course, other vehicle types could be used and are contemplated as equivalent provided they are suitable for the intended purpose of marrying chassis components to automotive bodies.

Figure 2:
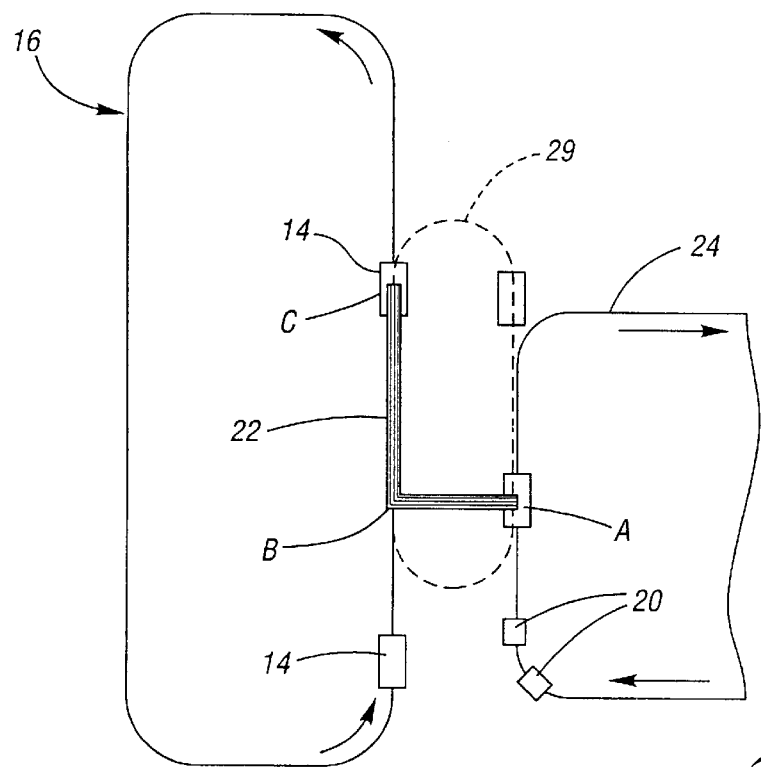
FIG. 2 is a diagrammatic plan view showing the overhead auto body and chassis module conveyors, as well as the L-track used for guiding the lift machine of FIG. 1.

FIG. 1 illustrates a self-powered vehicle 26 having an on-board drive motor 27 that drives the vehicle 26 along the guide track 22 in conventional manner. Referring to FIG. 2, the track 22 can be an L-track defined by points A,B,C. When at point A, lift machine 10 is in position to receive and support a chassis module 20 from overhead conveyor 24. As will be appreciated, the lateral offset between points A and 2 is selected to prevent any interference between the vehicle body overhead conveyor 16 and the chassis module overhead conveyor 24.

Once lift machine 10 has received a chassis module at point A, lift machine 10 moves to point B where is comes into alignment with a vehicle body 14 from overhead conveyor 16. Lift machine 10 then moves synchronously with vehicle body 14 between points B and C while the chassis module 20 is lifted and fastened into the vehicle body. Thereafter, lift machine 10 returns to point A to repeat the cycle.

Alternatively, rather than using L-track 22, lift machine 10 can be incorporated into an AGV (FIG. 8) that is programmed to follow a predetermined endless path, such as that shown at 26 in FIG. 2. A suitable AGV is available from CEC of Arbor Springs, Mich.

The fastening of chassis module 20 to vehicle body 14 can be carried out either manually or automatically. In the illustrated embodiment shown in FIGS. 1 and 2, fastening is carried out automatically and in a conventional manner using a mobile screw station 28 that reciprocates between points B and C on track 22. Screw station 28 moves synchronously with lift machine 10 and vehicle body 14 from point B to point C, during which time chassis module 20 is secured to vehicle body 14 using fasteners (not shown). Automatic fastening is accomplished using a pallet 30 that is attached to lift machine 10 and that is used to hold and properly locate chassis module 20 for assembly into vehicle body 14. Pallet 30 can be used to hold each of the required fasteners 32 at the proper location in preparation for fastening of the chassis module to the vehicle body.

Pallet 30 also includes nut drivers (not shown) for each of the fasteners. Screw station 28 includes motorized drives 34, each of which mates with a corresponding nut driver in pallet 30 to provide automated tightening of the fasteners. As screw station 28 moves along track 22 with lift machine 10, it extends its motorized drives 34 upwards until they engage their associated nut drivers. The fasteners can then be automatically tightened into vehicle body 14.

Figure 3:
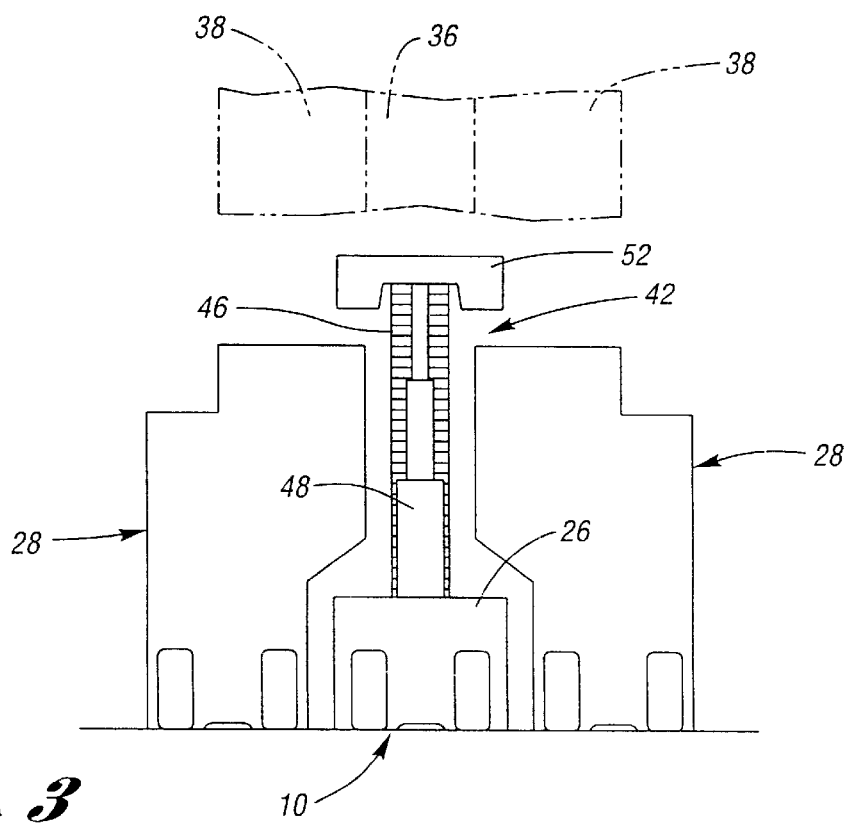
FIG. 3 is a diagrammatic front view of the lift machine and screw station that are used to marry and fasten the chassis module to the auto body.

Screw station 28 must fasten chassis module 20 to vehicle body 14 while the chassis module is being held in an upper position against the underside of the vehicle body. Thus, lift machine 10 must be able to hold the chassis module in the upper position without blocking access to any of the fastening points. In most vehicle designs, there is an approximately six inch wide longitudinal strip along the length of the vehicle in which no fasteners 32 are needed for fastening of the chassis module to the vehicle body. As shown in FIG. 3, this strip defines an interference-free region 36 that extends lengthwise along the longitudinal axis of the lift machine and widthwise between opposed fastening regions 38, 40.

The avoid interference with screw station 28, lift machine 10 includes at least one and often two guided lift mechanisms 42 mounted on the vehicle 26 at opposite front and rear ends there. The lift mechanisms are designed to extend only within this interference-free region during the raising and lowering of chassis module 20.

Although the lift machine depicted in FIG. 1 is shown front and rear guided lift mechanisms 42, it will be understood that only a front or rear lift mechanism may be required, depending upon the application. In this regard, it should be noted that chassis module 20 can be the full vehicle chassis module, including the engine, transmission, drive train, and suspension requiring both the front and rear lift mechanisms 42, or can be a portion of the full vehicle chassis module, such as a front or rear chassis module, in which case only one of the front and rear lift mechanisms 42 may be required.

In the description that follows, reference will be made to a single lift mechanism 42. However, for those applications utilizing both front and rear lift mechanisms, the other lift mechanism could be and preferably is identical to the one described below and the two lift mechanisms could be run synchronously to raise a full chassis module into place. For this purpose, the two lift motors used to raise the chassis module could include position encoders or other position sensors to permit the synchronous operation.

As shown in FIGS. 4–7, lift mechanism 42 is constructed preferably as a separate, self-contained unit apart from the vehicle 26 and includes a base 44, push chain 46, support members 48, 49 and 50, a fixture 52, chain lift motor assembly 54, and a chain take-up magazine 77. The motor assembly 54 and magazine 77 are rigidly mounted on the base 44. The base 44 is, in turn, mounted on a bed 57 of the vehicle 26, which is spaced a predetermined fixed distance above the shop floor 22. It is preferred that the lift mechanism 42 be mounted releasably on the bed 57, so that the mechanism can be attached and detached from the vehicle 26 when needed for maintenance or replacement. Accordingly, bolts 58 or other suitable fastening means may be employed to secure the base 44 to the bed 57. Alternatively, the base 44 could be permanently affixed to the vehicle 26 such as by weldments or the like.

Figure 4:
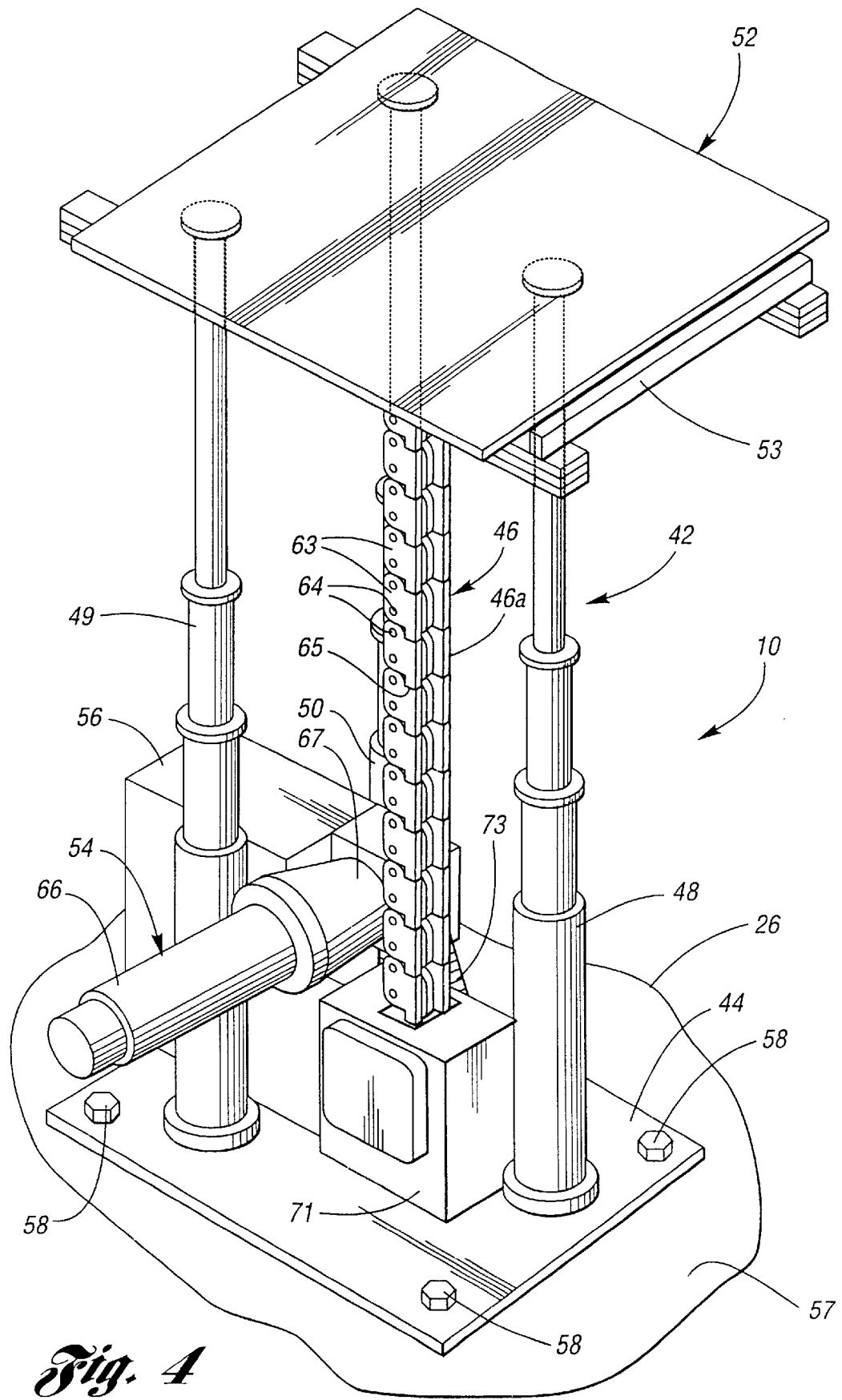
FIG. 4 is an enlarged perspective view of a preferred push chain lift mechanism unit constructed in accordance with the invention.
Figure 5:
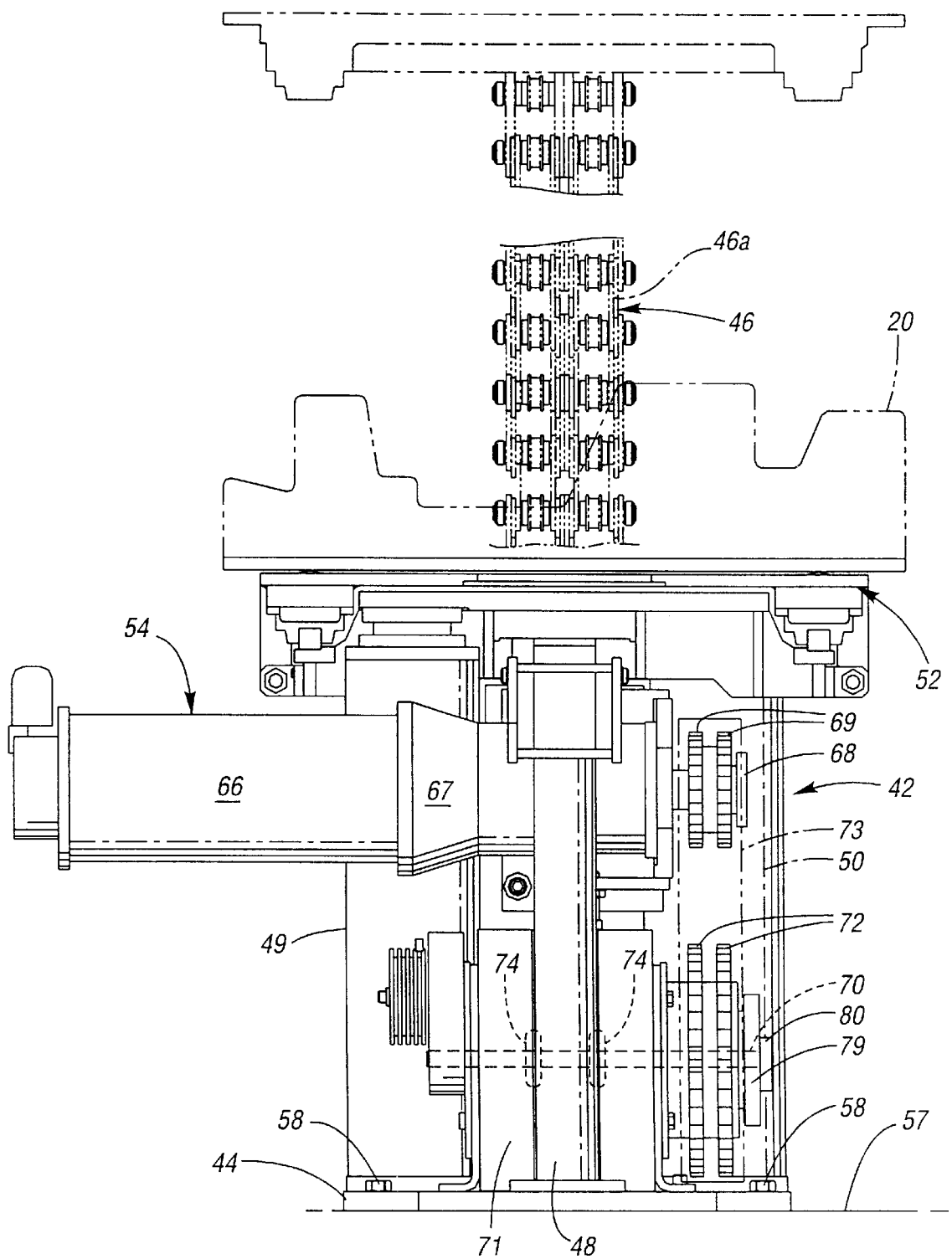
FIG. 5 is a front elevation view of the push chain lift mechanism of FIG. 4 shown in the fully lowered solid line position and fully raised broken chain line position, respectively.
Figure 6:
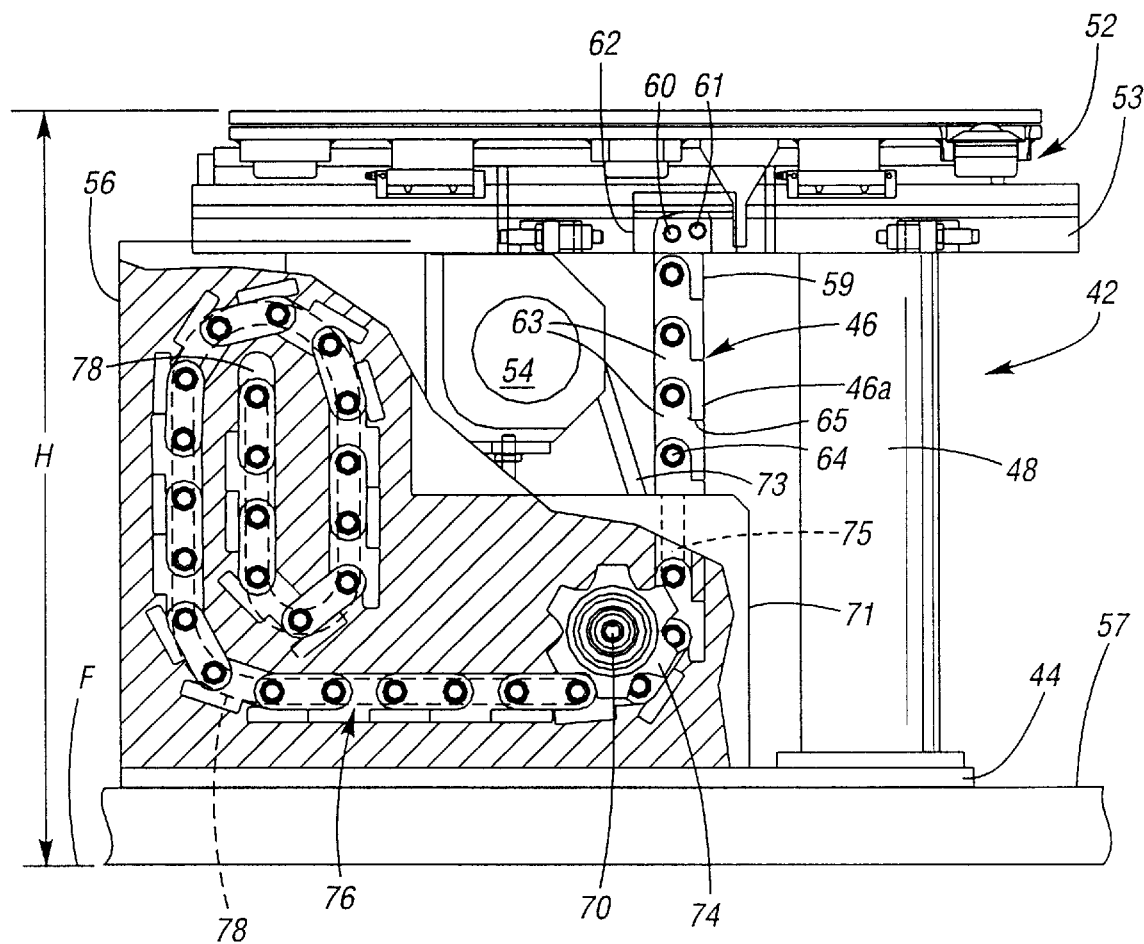
FIG. 6 is an enlarged side elevation view of the push chain lift mechanism of FIG. 5 shown in the lowered position.
Figure 7:
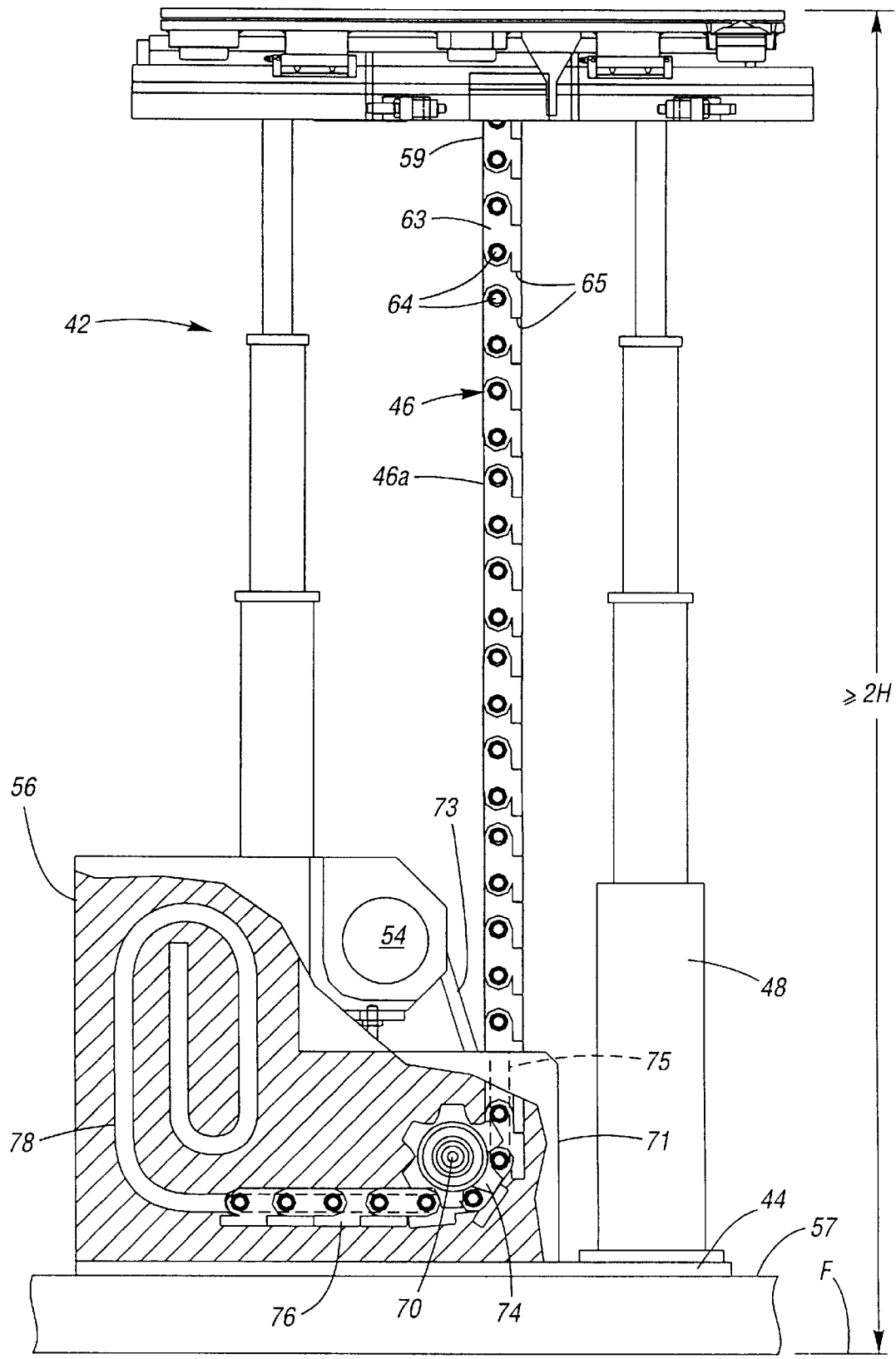
FIG. 7 is a view like FIG. 6 but showing the mechanism in the fully raised position.

The push chain 46 has an upper end 59 that is fixed by mounting pins 60, 61 to a bracket 62 provided on the underside of a horizontally restrained base 53 of the fixture 52, as shown best in FIG. 6. The push chain 46 is made up of a plurality of individual links 63 that are coupled to one another by offset pivot connections 64 and have abutting heels 65 provided opposite the pivot connections 64. As shown best in FIGS. 6 and 7, the pivot connections 64 and heels cooperate to permit the chain 46 to flex and coil upon itself in one direction while restraining the chain 46 from flexing in the opposite direction. When a section 46a of the chain 46 is extended vertically, as illustrated in FIGS. 4, 5 and 7, the heels 65 of that section abut and interlock to render the section rigid and able support a load and transmit a vertically upward pushing force on the fixture 52.

It will be seen from FIG. 6 that one of the mounting pins 61 (to the right in the Figure) is offset from the pivot connections 64 and in line with the heels 65. This location of the pin 61 causes the weight of fixture 52 and any chassis component 20 supported thereon to impart a vertical compressive load on the vertical section 46a of the chain 46 in line with the heels 65, rocking the links 63 over center of their pivot connections 64, and locking the heels 65 in engagement with one another. A suitable push chain is a 60JG chain, available from Serapid USA, Inc. of Troy, Mich.

Support members 48, 49 and 50 operate to guide the fixture 52 in the vertical direction while restraining the base 53 of the fixture 52 against horizontal movement relative to the base 44 of the lift mechanism 42. Such support of the fixture 52 helps maintain the heels of chain 46 into abutting engagement with each other and isolates the vertical section 46a from any lateral forces that might act on the chain to move the heels 65 out of interlocking engagement with one another. Support members 48, 49 and 50 preferably comprise vertical telescoping guides or multistage guides, as illustrated, of the type constructed from telescoping cylindrical column members that extend freely in the vertical longitudinal direction with the movement of the fixture 52, but restrain the fixture 52 against horizontal movement.

The fixture 52 includes a conventional floating plate mechanism 66 that is slidably supported on the horizontally restrained base plate 53. The floating plate 66 is movable horizontally relative to the base plate 53 both longitudinally and laterally of the vehicle 26 to enable corresponding adjustment in the position of the pallet 30 and thus the component 20.

The motor assembly 54 that drives the chain 46 includes an electric motor 66 that may be conveniently coupled to an onboard battery (not shown) or an external power source (not shown) for operation. Electric motor 66 can be a 5B-4810236 permanent magnet motor, manufactured by Mankato Manufacturing Company of Mankato, Minn. Gearbox 66 can be a GKS 07-3N 76:1 gearbox, manufactured by Lenze GmbH & Co. of Hameln, Standort, Germany.

The motor 66 is drivingly coupled to a reducing gear box 67. An output rotary shaft 68 extends from the gear box 67 and mounts at least one and preferably a pair of drive sprockets 69 which rotate with the shaft 68 when driven by the motor 66. A driven shaft 70 is journaled adjacent its opposite ends by a drive housing 71 in spaced relation to the drive shaft 68. The driven shaft 70 mounts at least one and preferably a pair of driven sprockets 72 that are drivingly coupled to the corresponding sprockets 69 by an endless single or double drive chain 73 to impart rotation to the driven shaft 70. It will be appreciated that the chain and sprocket drive is but one way of driving the driven shaft 70 and other arrangements are contemplated within the scope of the invention. for example, the electric motor 66 could be oriented longitudinally rather than laterally of the vehicle 11 and be coupled to a 90° gearbox that is connected by chain and sprocket or direct drive gearing to the driven shaft 70.

Also mounted on the driven shaft 70 within the drive housing 71 is at least one and preferably a pair of push chain drive sprockets 74 enmeshed with the push chain 46. As shown best in FIGS. 4, 6 and 7, the housing 71 is preferably a 90° drive housing having an arcuate guide channel 75 adjacent the sprockets 74 that supports the push chain 46 in engagement with the sprockets 74. The channel 75 opens vertically out of the housing 71 to direct the extended portion 46a of the chain vertically in the heel-locked condition. The excess chain 76 received into the channel 75 as the chain 46 is retracted is driven around a 90° elbow or bend of the channel 75 by the sprocket 74 to unlock the heels 65 and to redirect the excess portion 76 horizontally.

The chain take-up magazine 56 is connected to the drive housing 71 and has a similarly constructed channel or chain guide 78 that extends in prolongation of the channel 75 and is preferably coiled in order to store the excess portion 76 in a compact state when the chain is retracted. The housing 71 and magazine 56 may be constructed as separate, matable components, or may be fabricated as a single unit. Thus, as shown best in FIGS. 6 and 7, the channels 75, 78 and sprocket 70 are arranged to drive and guide the chain 46 in a vertical plane parallel to the longitudinal axis A of the machine 10. The magazine 56 preferably stores the excess retracted portion 76 of the chain 46 substantially beneath the fixture 52. In this way, the lift mechanism 42 remains a compact, self-contained unit on its base 44. A suitable drive housing 71 can be a 90° drive housing, available from Serapid USA, Inc. Magazine 56 can be a push chain guided return, available from Serapid USA, Inc.

The motorized drive system for the push chain 46 is provided with an automatic brake 79 that may be coupled to the driven shaft and which is operative to lock the driven shaft 70 from rotating whenever the motor 66 is stopped. In this way, the brake 79 restrains the sprockets 74 against rotation and maintains the extended portion 46a of the chain 46 in a fixed position, supporting the chain against retracting under the weight of the load into the drive housing 71. A suitable brake 79 can be an ER-475, manufactured by Warner Electric of South Beloit, Ill.

Also provided is a manual override feature that enables the driven shaft 70 to be manually rotated in the event there is a failure in the power supply to the motor 66 to facilitate the raising or lowering of the fixture 52. The override feature may take the form of a manual coupling 80 provided on an extended portion of the driven shaft 70 projecting from or accessible through the drive housing 71. the coupling may comprise a shaft section having splines, flats, a yoke, a transverse pin, or the like that can be readily coupled with an external drive. The external drive may comprise a manually operated tool or an auxiliary motor drive.

One advantage of the use of push chain 46 is that it allows fixture 52 to be held at a relatively low position when the chain is retracted, yet allows the fixture to be lifted to relatively large heights. In particular and as shown in FIG. 6, the use of chain 46 permits fixture 52 to be lowered to a height H of preferably about 29 inches above the plant floor F, yet permits fixture 52 to be raised by a distance that is greater than, and preferably at least twice that of H to an extended height of about 67 inches above the plant floor F, as shown in FIG. 7.

According to a method of the invention for constructing and operating a chassis module lift machine 10, at least one and in many applications two mechanical push chain lift devices 42 are constructed in the above described manner and are mounted on opposite ends of a mobile lift machine vehicle 11. The motors 66 are operated to lower the fixtures 52 to the lowered positions, retracting and storing the excess of the push chains 46 into the housings 71 and magazines 56. The machine is moved into position beneath a vehicle body and the motors are operated to extend vertical sections 46a of the chains 46 above their housings 71 to lift the fixtures 52 and chassis modules 20 to the raised position. At least one and preferably two or three vertical guides are provided between the vehicle and each of the fixtures 52 to support the fixtures during their vertical movement and isolating then push chains 46 from any non-vertical loads that would tend to urge the heels 65 of the vertical sections 46a out of locked engagement with one another.

Figure 8:
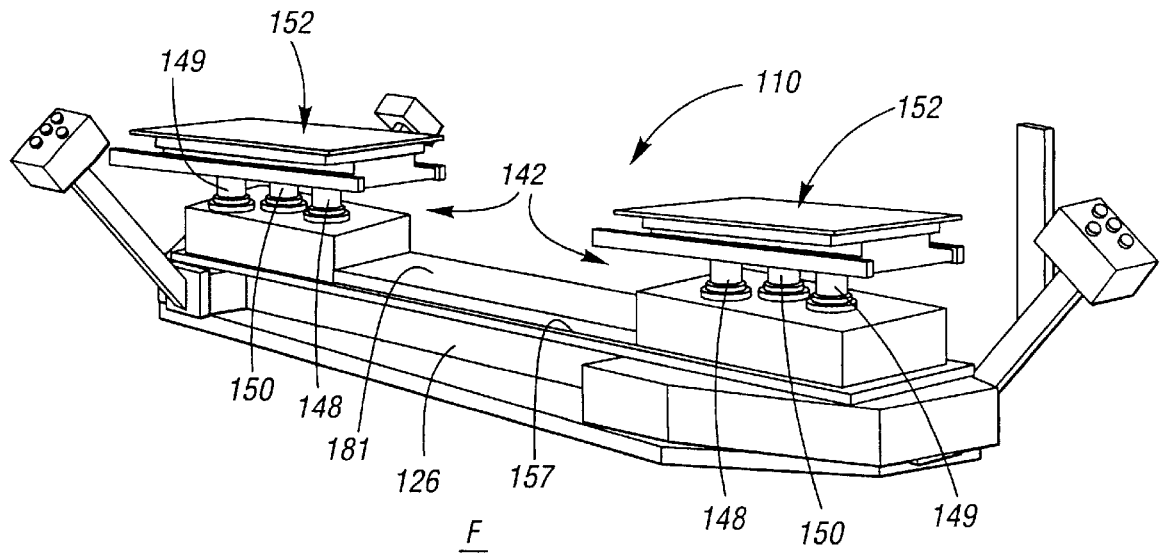
FIG. 8 is a perspective view of an AGV lift machine constructed according to the present invention.
Figure 9:
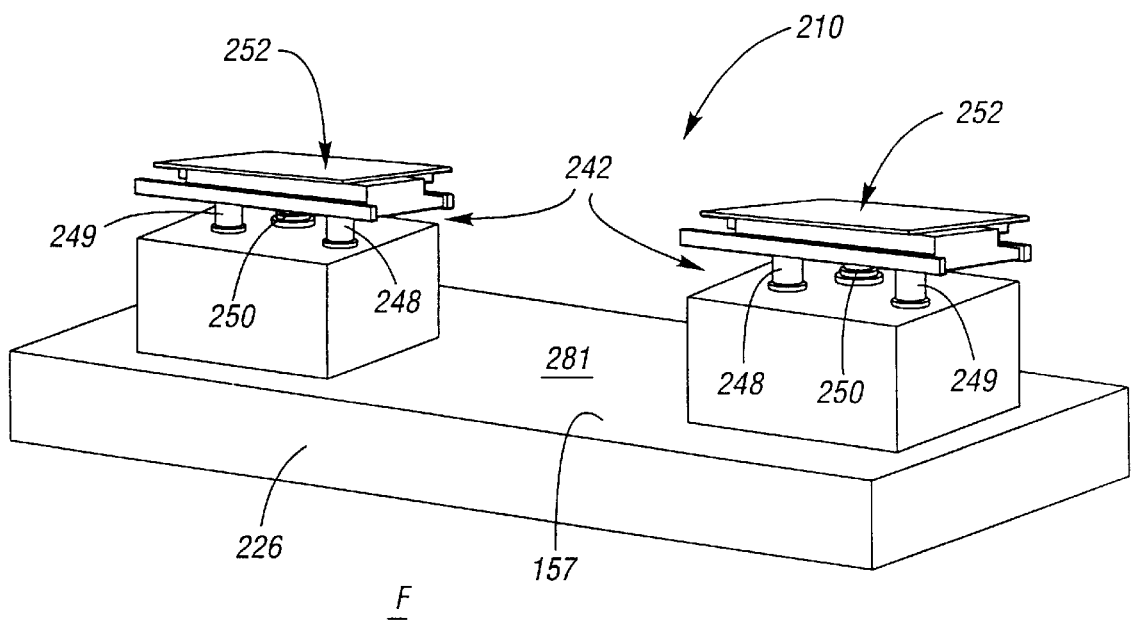
FIG. 9 is a view like FIG. 8 but of a tow-veyor lift machine constructed according to the invention.

FIGS. 8 and 9 illustrate two applications of the invention, namely in connection with an AGV chassis lift machine 110 and a tow-veyor chassis lift machine 210, in which like reference numerals are used to designate like parts, but are offset by 100 and 200, respectively. Both are equipped with dual push chain lift mechanisms 142, 242 of the invention arranged at opposite longitudinal ends of their vehicles 111 and 211 in spaced relation to one another.

In the case of the AGV, a longitudinal region between the lift mechanisms 142 is at a height above the floor F that is at or below the level of the bed 157 of the machine 110 on which the mechanisms 142 are mounted, defining a low profile walk-through section 181 between the lift mechanisms 142. The section 181 need be only as high as to accommodate any of the drive components and controls (not shown) of the AGV and which may extend only partially across the region 181 so as to provide low profile walk-through regions immediately adjacent the lift mechanisms 142 with a somewhat higher region in the middle to house the components and controls.

In the case of the tow-veyor 210, there are no onboard drive components or controls, and as such the region 280 between the lift mechanisms 242 may be as low as permissible (i.e., at or below the level of the bed 257) to provide a large, unencumbered walk-through area 280.

It will thus be apparent that there has been provided in accordance with the present invention a chassis/body marriage lift machine which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. Apparatus for lifting and supporting an automotive chassis module in position to be assembled with an automotive body along a moving assembly line, said apparatus comprising:

a mobile vehicle;

at least one fixture arranged above said vehicle for receiving and supporting the chassis module; and a guided lift mechanism for moving said fixture vertically between a lowered position and a raised position, said mechanism including a push chain coupled to said fixture, at least one sprocket drivingly engaging said chain to displace a vertical section of said chain vertically to move said fixture between said lowered and said raised positions, and at least one support member extending between said fixture and said vehicle operative to guide said fixture in the vertical direction while isolating said push chain from any loads transverse to said vertical direction.

2. The apparatus of claim 1 wherein said vehicle comprises an automatic guided vehicle.

3. The apparatus of claim 1 wherein said vehicle comprises a tow-veyor.

4. The apparatus of claim 1 including a base removably mounted on said vehicle, and wherein said guided lift mechanism is mounted on said base.

5. The apparatus of claim 1 wherein said support member comprises at least a pair of vertically extendible guides spaced laterally from and extending parallel to said vertical section of said chain.

6. The apparatus of claim 1 wherein said at least one support member comprises at least three vertically extendible guides spaced laterally from and extending parallel to said vertical section.

7. The apparatus of claim 1 including a chain take-up magazine adjacent said sprocket for storing an excess portion of said chain in a coiled configuration.

8. The apparatus of claim 1 wherein there are a pair of said guided lift mechanisms supported on said vehicle in longitudinally spaced relation to one another.

9. The apparatus of claim 8 including a pair of bases detachably mounted on said vehicle in said longitudinally spaced relation and wherein said guided lift mechanisms are each mounted on a respective one of said bases so as to be readily mounted and dismounted from said vehicle.

10. The apparatus of claim 9 wherein said bases are located at a predetermined height on said vehicle and wherein said vehicle includes a longitudinal region provided between said bases.

11. The apparatus of claim 10 wherein said longitudinal region includes walk-through sections adjacent each of said bases having a height about the same or less than that of said bases.

12. The apparatus of claim 11 wherein said walk-through sections have a height about the same as that of said bases.

13. The apparatus of claim 4 including a motor mounted on said base and operatively coupled to said sprocket to drive said chain.

14. The apparatus of claim 13 wherein said motor includes an automatic brake for retaining said fixture in any selected one of a plurality of vertical positions of adjustment.

15. The apparatus of claim 13 wherein said motor includes a manual override connection to permit said motor and said chain to be driven manually.

16. The apparatus of claim 1 wherein said fixture is located at a retracted height H when in said lowered position and located at an extended height measuring at least twice that of said retracted height.

17. The apparatus of claim 16 wherein said retracted height is about 29 inches above a factory floor surface along which said vehicle moves and said extended height is about 67 inches above said factory floor.

18. The apparatus of claim 8 wherein said vehicle has a longitudinally extending interference free region, said lift mechanisms being located within said interference free region.

19. A method of supporting and lifting an automotive chassis module for assembly with an automotive body, said method comprising the steps of:

loading the chassis module onto a fixture supported at a lowered position and coupled to a push chain lift mechanism mounted on a mobile vehicle;

operating the lift mechanism to extend a section of push chain and the fixture vertically upwardly to a raised position; and providing at least one vertical guide between the fixture and the vehicle to support the fixture during its vertical movement while isolating the push chain from any non-vertical loads.

20. The method of claim 19 including storing a retracted section of the push chain in a coiled condition beneath the fixture.

* * * * *